March 8, 1966     F. H. GOODE ETAL     3,239,646
METHOD OF AND APPARATUS FOR MONITORING WELDS
Filed June 25, 1962     4 Sheets-Sheet 1
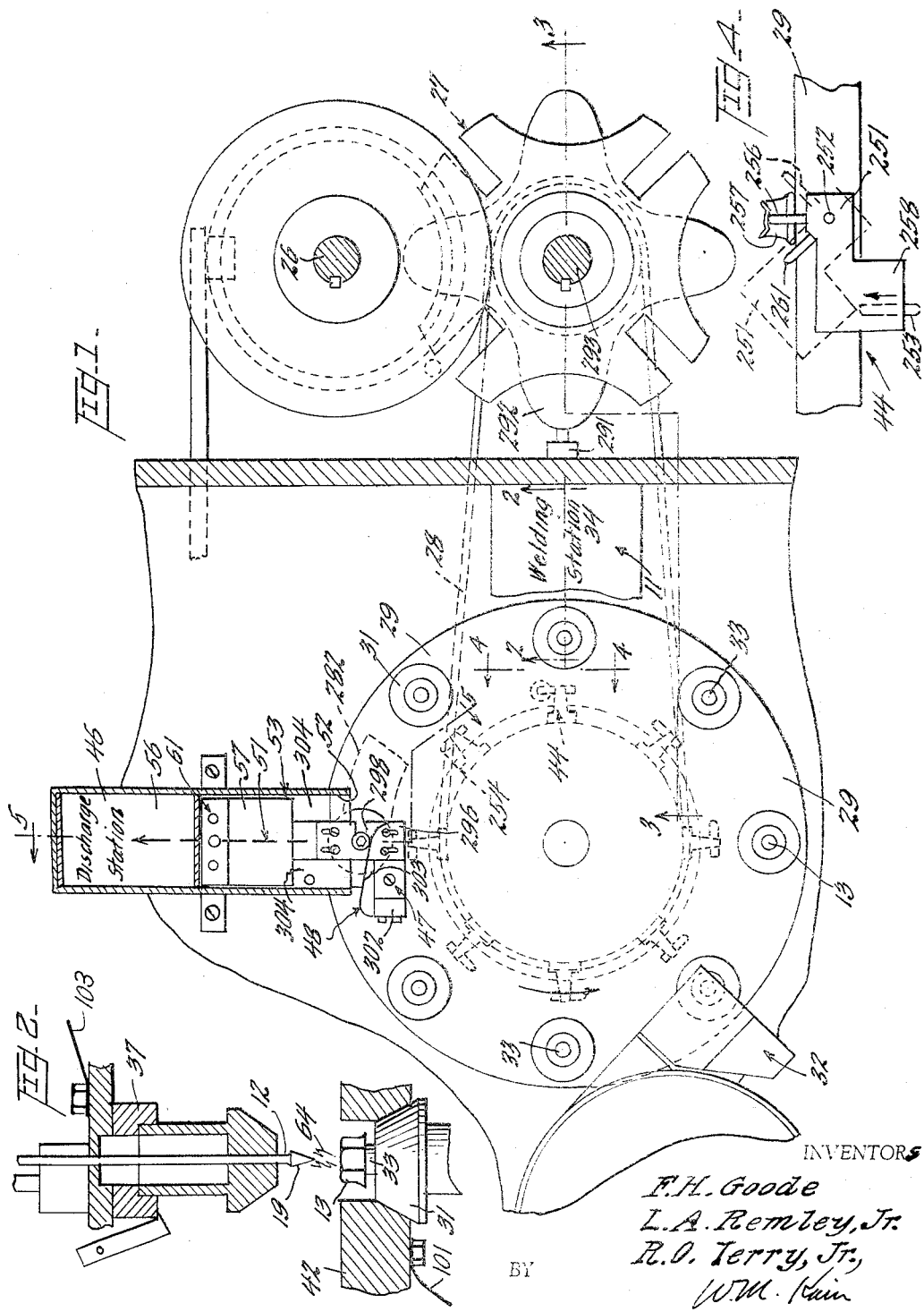
INVENTORS
F. H. Goode
L. A. Remley, Jr.
R. O. Terry, Jr.
BY W. M. Kain
ATTORNEY

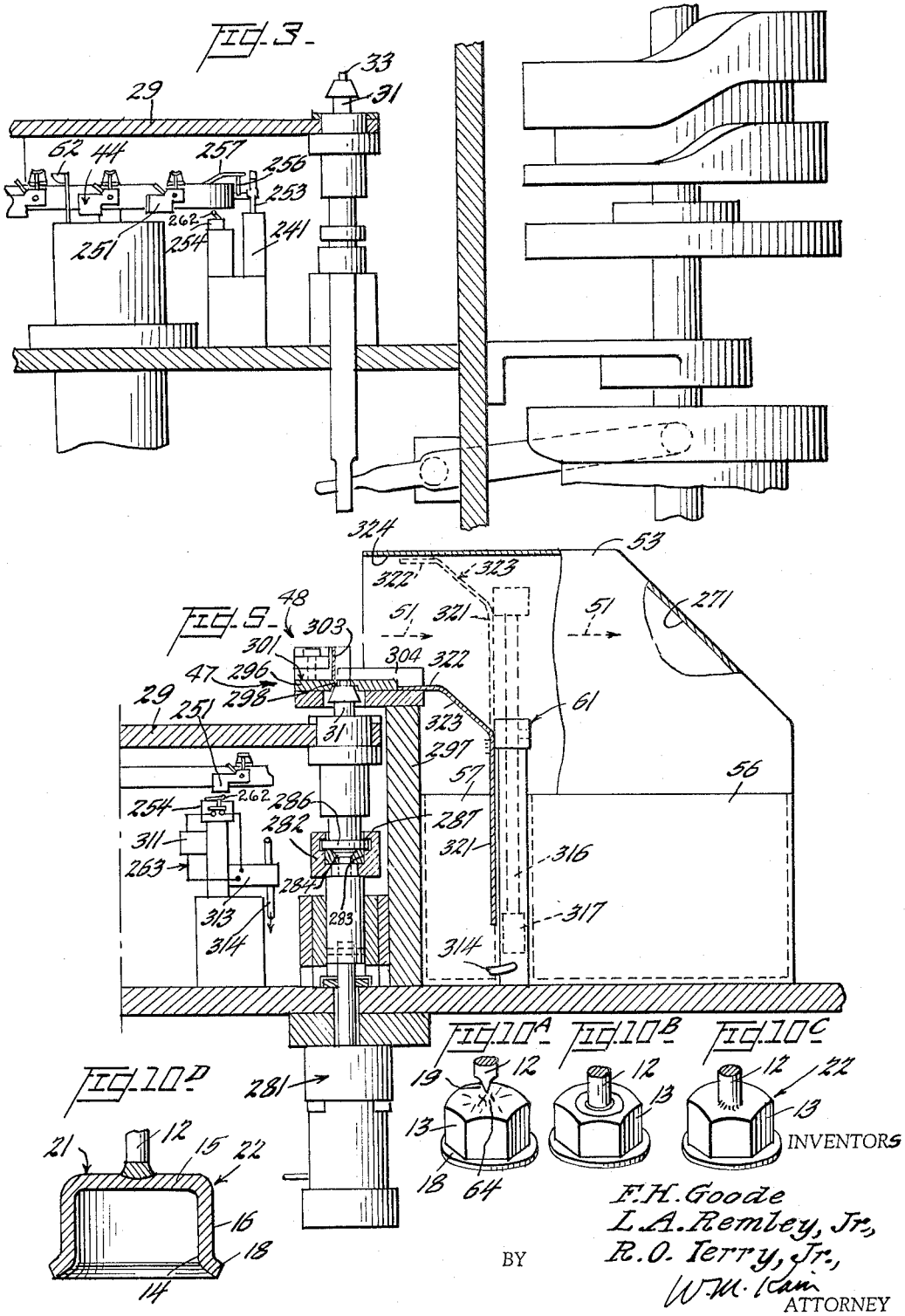

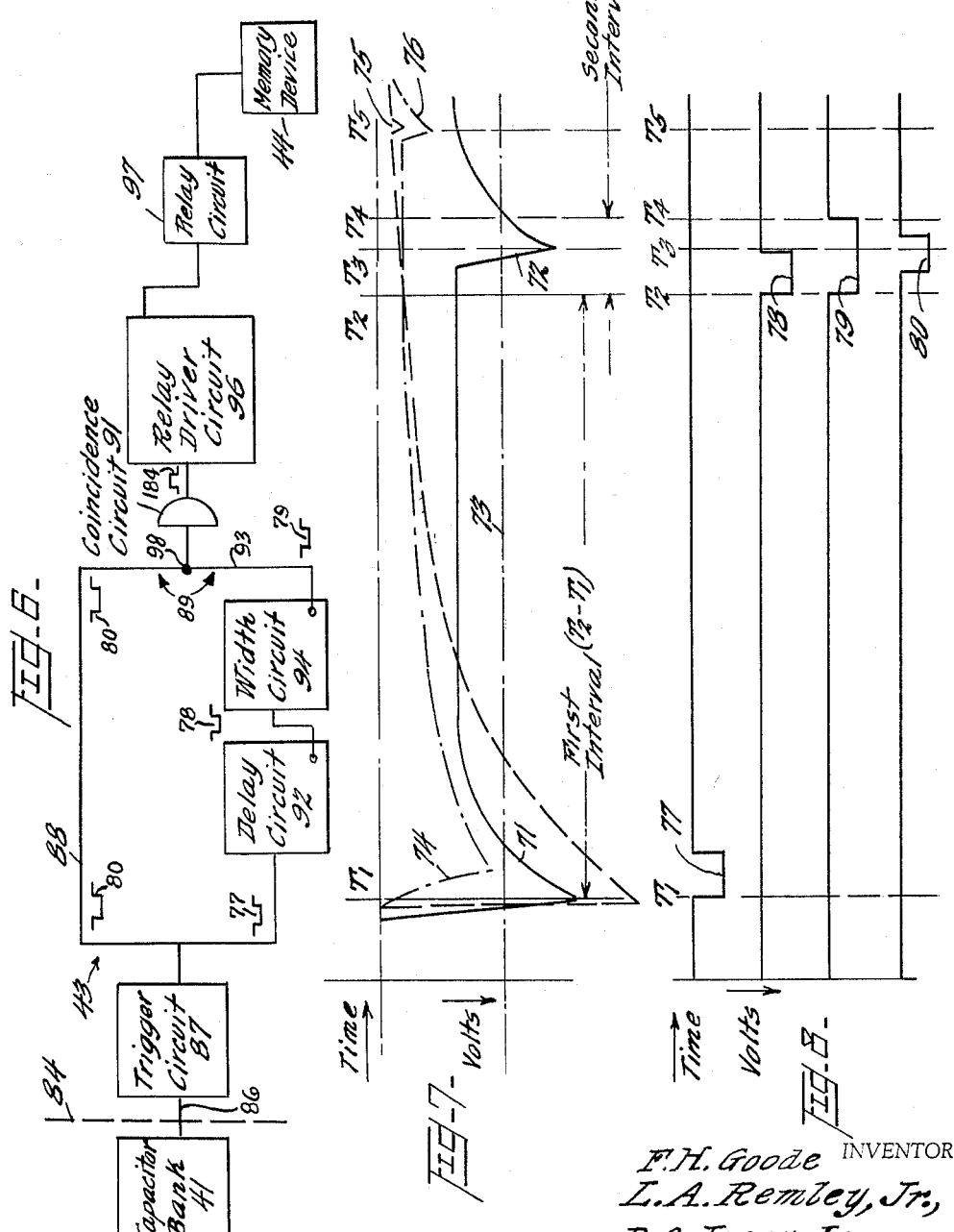

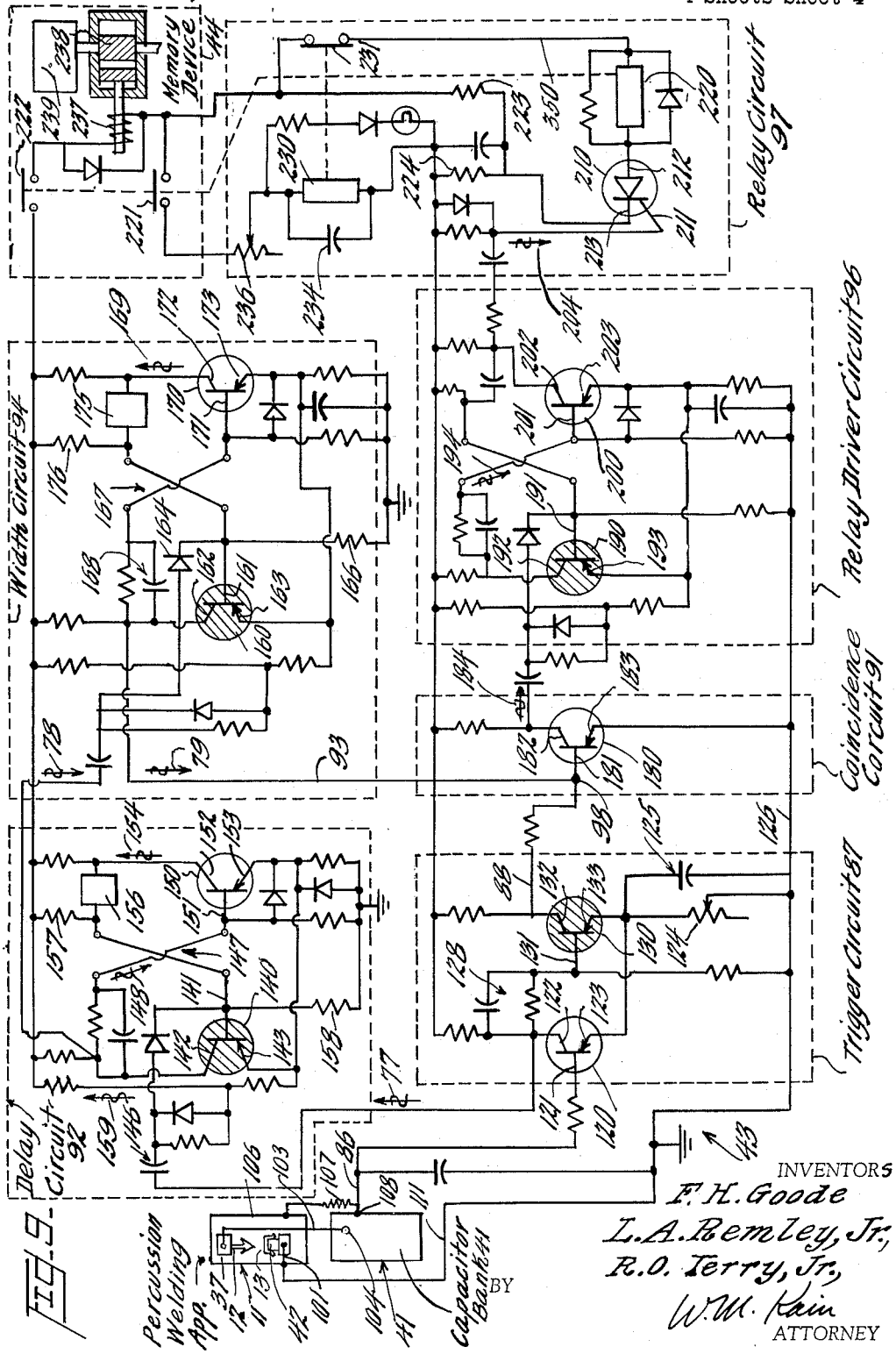

United States Patent Office 3,239,646
Patented Mar. 8, 1966

3,239,646
METHOD OF AND APPARATUS FOR
MONITORING WELDS
Floyd H. Goode, Kernersville, N.C., Leo A. Remley, Jr.,
Arvada, Colo., and Raymond O. Terry, Jr., Winston-
Salem, N.C., assignors to Western Electric Company
Incorporated, New York, N.Y., a corporation of New
York
Filed June 25, 1962, Ser. No. 204,894
12 Claims. (Cl. 219—109)

This invention relates to methods of and apparatus for monitoring welds and more particularly to methods of and apparatus for sorting percussively welded articles according to the magnitude of and interval between percussion welding pulses generated during welding of the articles.

In manufacturing operations it is sometimes necessary to join components by welding. More particularly, in operations for manufacturing articles such as deposited carbon resistors, a first component, such as a solder-plated copper wire, is percussion welded to a second component, such as a gold-plated brass ferrule that is to be provided on each end of the resistor.

In the welding operation, the components to be connected, the furrule and the wire, are connected to the two terminals of a charged capacitor bank. One component, the wire, for example, is moved toward the other component at high speed. Just prior to the point of contact, the distance or gap between the components becomes sufficiently small to permit arcing, whereupon the capacitor bank discharges in an arc of short duration across the gap. Heat from the arc melts a thin layer on the surfaces of both components. The movement continues until the components come into contact, at which time the movement is stopped mechanically, and the arc is extinguished by contact of the molten surfaces. The components are held firmly together until the surfaces solidify.

An analysis of percussive welds manufactured according to the above-described operation indicates that certain factors; namely, the shape of the wire tip, the approach velocity of the wire, and the welding capacitance, contribute to the strength of the percussion weld.

Research conducted in an endeavor to provide suitable methods and facilities for detecting and sorting articles joined by low-strength or otherwise unsatisfactory welds, indicates that for a given set of conditions, changes in the above-described factors cause corresponding changes in either the amplitude of the capacitor discharge current or the duration of the welding arc.

An object of the present invention is to provide new and improved methods of and apparatus for monitoring welds.

Another object of this invention resides in methods of and apparatus actuated in response to a predetermined duration of a percussion welding arc for indicating characteristic of a percussion weld produced by the arc.

A further object of the present invention is to provide methods of and apparatus responsive to the amplitude of a succession of welding pulses generated upon striking and extinguishment of a welding arc for indicating characteristics of a percussion weld.

A still further object of this invention is the provision of methods of and percussion weld-analyzing apparatus for determining that the duration of a welding arc and the amplitude of welding pulses generated during striking and extinguishment of the arc conform to preselected standards.

An additional object of this invention resides in methods of and apparatus for applying a welding arc pulse having a predetermined magnitude in overlapping relationship with a contact pulse having a predetermined magnitude to facilities for indicating the acceptability of a percussion weld.

An added object of this invention resides in methods of and facilities for monitoring pulses generated during percussion welding of a pair of components wherein instrumentalities are operated by the facilities for sorting defectively welded component assemblies.

A related object of this invention resides in a weld monitoring circuit for transmitting to a memory facility information indicative of the quality of a weld joining components advanced by a carrier, wherein the facility selectively operates an instrumentality for removing welded components from the carrier according to the quality of the weld.

With these and other objects in view, the present invention contemplates a method of indicating the quality of a percussion weld wherein a first pulse is generated in response to the striking of a welding arc between a pair of elements. A second pulse is generated in response to the percussive contact between the pair of elements. First and second pulses below a predetermined magnitude are blocked, whereafter an unblocked first pulse above the predetermined magnitude is delayed for an interval indicative of a satisfactory welding operation. An unblocked second pulse above the predetermined magnitude and the delayed first pulse are simultaneously applied to a coincidence detecting circuit which produces an output signal. The output signal operates a device for indicating the quality of the percussion welding operation.

Additionally, with the foregoing objects in view, the present invention contemplates a percussion weld monitoring apparatus including a trigger circuit successively responsive to pulses above a trigger voltage and generated upon successive striking and extinguishment of a percussion welding arc for generating successive signals spaced by the interval between the striking and extinguishment of the welding arc. A circulit delays a first of the successive signals for the interval and applies the delayed signal to a coincidence circuit. Upon simultaneous receipt of the delayed signal and a second of the successive signals, the coincidence circuit actuates facilities for sorting a percussion welded article according to the quality of the percussion weld.

A complete understanding of this invention may be had by reference to the following detailed description when read in conjunction with the accompanying drawings illustrating a preferred embodiment thereof, wherein:

FIG. 1 is a schematic plan view of an appartus for monitoring percussion welds according to the principles of this invention showing a carrier for indexing a series of welded assemblies from a welding station to a discharge station;

FIG. 2 is an elevational view taken along line 2—2 in FIG. 1 showing a welding operation wherein a movable electrode advances a lead wire into percussive engagement with a ferrule mounted on the carrier;

FIG. 3 is an elevational view taken on line 3—3 of FIG. 1 showing a memory device actuated by the monitoring apparatus for storing, for each tested welded assembly, information indicating the conformity of the weld to preselected standards;

FIG. 4 is an enlarged elevational view of the memory device shown in FIG. 3 illustrating a flag and a resilient latch for retaining the flag in information storing positions;

FIG. 5 is an elevational view taken in cross-section along line 5—5 of FIG. 1 showing a flipper mechanism for removing welded assemblies from the carrier along with a device actuated by the flag for sorting the removed assemblies;

FIG. 6 is a schematic diagram of a circuit for monitoring percussion welds;

FIG. 7 is a graphical diagram distinguishing the time and voltage relationships of arc and contact pulses generated during the production of an acceptable weld from arc and contact pulses generated during the production of a defective weld;

FIG. 8 is a graphical diagram of signals generated by the weld monitoring circuit in response to the acceptable arc and contact pulses shown in FIG. 7;

FIG. 9 is an electrical diagram showing the circuitry of and connections between electrical components of the weld monitoring circuit shown schematically in FIG. 6;

FIG. 10a is a perspective view showing the lead wire advancing into percussive engagement with the ferrule wherein a welding arc is struck between the wire and the ferrule;

FIG. 10b is a perspective view showing the surface of the ferrule and the leading tip of the lead wire melted by the welding arc;

FIG. 10c is a perspective view of a welded terminal assembly showing the lead wire welded to the ferrule; and FIG. 10d is a cross-sectional view of the welded terminal assembly shown in FIG. 10c illustrating the welded junction between the lead wire and the ferrule.

Referring now to the drawings wherein like reference numerals designate like apparatus, an apparatus of the present invention for practicing the method to monitor percussion welds, is described with relation to an apparatus 11 (FIG. 1) for percussion welding terminal leads, such as wires 12, to components 13 (FIG. 2), such as ferrules, which are to be applied to the ends of articles such as deposited carbon resistors. The complete details of a suitable percussion welding apparatus may be appreciated upon reference to Patent 2,986,625, issued on May 30, 1961, to J. C. Houda et al.

Referring to FIGS. 10a–10d, the ferrules 13 are shown having an open end 14 and an end wall 15 joining an annular side wall 16 that flares outwardly to form a flange 18. The lead wire 12 is provided with a pointed tip 19 which, along with the surface 21 of the end wall 15 of the ferrule 13, is melted during a welding operation to form a welded terminal assembly 22 that may be applied to the end of a deposited carbon resistor, for example.

For the purpose of illustrating the present invention, pertinent features of the apparatus 11 disclosed in the above-mentioned patent 2,986,625 are shown in FIG. 1 including a continuously driven shaft 26 for operating a Geneva drive mechanism 27. The Geneva drive mechanism 27 intermittently actuates a belt drive 28 that indexes a carrier or turret 29 provided with a series of holders or anvils 31 mounted for vertical sliding movement relative to the carrier 29. The holders 31 are indexed by the carrier 29 in a circular path to a feed station 32. At the feed station 32, the open end 14 of a ferrule 13 is mounted over a post 33 provided on each holder 31, whereafter the holders are indexed by the carrier 29 to a welding station 34.

Referring to FIG. 2, a movable electrode 37 is shown provided at the welding station 34 for advancing the lead wire 12 into percussive engagement with a mounted ferrule 13. As the wire 12 and the ferrule 13 percussively engage, a welding current supply circuit or capacitor bank 41 (see FIGS. 6 and 9) connected across the movable electrode 37 and a fixed electrode 42 that is electrically connected to the holder 31, supplies welding current for effecting the percussion welding of the wire 12 and the ferrule 13. As the percussion weld is effected, a weld monitoring apparatus 43 (FIG. 9) constructed according to the principles of the present invention, analyzes the percussion weld and operates a memory device 44 according to the quality of or conformity of the weld to preselected manufacturing standards.

The carrier 29 then indexes the welded assembly 22 to a discharge station 46. The apparatus at the discharge station is constructed according to the principles of the present invention and includes a stripper mechanism 47 and a removing device 48 (FIG. 5). The stripper mechanism 47 and removing device 48 are effective, respectively, to strip the welded assembly 22 of the holder 31 and advance the assembly along a discharge path 51. The assembly 22 advances into an opening 52 provided in a hood 53 surrounding a first bin 56 for receiving assemblies 22 having acceptable welds and a second bin 57 for receiving assemblies having defective welds.

The memory device 44 (FIGS. 6 and 9) renders a sorter mechanism 61 of the present invention effective to interrupt the advancement of the assembly 22 toward the first bin 56 and direct the assembly to the second bin 57 if the weld monitoring apparatus 43 ascertains a defective condition or non-conformity of the weld to the manufacturing standards. The carrier 29 then indexes the empty holder 31 to the feed station 32 in anticipation of a subsequent cycle of operation whereupon the memory device 44 is restored to its original condition by a cam 62 (FIG. 3).

Referring in general to FIGS. 7 and 10a through 10c, a welding operation effected by the apparatus 11 of Patent 2,986,625, is commenced as the movable electrode 37 advances the lead wire 12 into percussive engagement with the ferrule 13. Just prior to the point of contact of the lead wire 12 and the ferrule 13, the capacitor bank 41 discharges, striking a welding arc 64 (see FIGS. 2 and 10a) across the lead wire 12 and the ferrule 13. As a result of striking the welding arc 64, the capacitor bank 41 generates an arc pulse 71 (FIG. 7). When the lead wire 12 and the ferrule 13 percussively engage and thus make physical contact (FIG. 10b), the welding arc 64 is extinguished and the capacitor bank 41 generates a contact pulse 72. (FIG. 7.)

The above-referred to analysis of percussion welds produced by this welding operation indicates that certain factors; namely, the shape of the lead wire tip 19, the approach velocity of the lead wire 12, and the welding capacitance of the capacitor bank 41 contribute to the quality of the percussion welds. Because the magnitudes of the voltages of the arc pulse 71 and the contact pulse 72 are proportional to the welding capacitance, and further because the duration of the welding arc 64 is indicated by the duration betwen the arc pulse 71 and the contact pulse 72, the manufacturing standards have been set forth in terms of the voltages of the arc and contact pulses 71 and 72 respectively and the interval between these pulses.

A typical manufacturing standard is illustrated in FIG. 7 wherein the arc pulse 71, generated during the production of an acceptable weld, is shown having a negative voltage exceeding a predetermined threshold or trigger voltage 73 indicated by the horizontal dash line. The contact pulse 72, generated during the production of an acceptable weld, is also shown having a negative voltage exceeding the trigger voltage 73. Thus, an arc pulse 74 and contact pulses 75 and 76 generated during the production of a defective weld, are shown having less negative voltages than the trigger voltage 73.

The manufacturing standard further sets forth as a minimum acceptable period of time between the arc pulse 71 and the contact pulse 72, a first time interval T2 minus T1 shown in FIGS. 7 and 8. A tolerance or second time interval, T4 minus T2, is also provided within which a contact pulse 72 must be generated to produce a satisfactory weld. Thus, it may be observed that the contact pulse 72 having a negative voltage exceeding the trigger voltage 73 and generated at a time T3, which is between time T2 and time T4, is acceptable; whereas the contact pulses 75 and 76 having voltages that are more positive than the trigger voltage 73 and occurring at time T5, are not acceptable.

In the method of monitoring the welding operation to determine the quality of the percussion weld, successively generated arc and contact pulses 74 and 76, respectively, having voltages less than the trigger voltage 73, are blocked; whereas successively generated arc and contact pulses 71 and 72, respectively, having voltages more negative than the trigger voltage 73, are passed in the form of arc and contact signals 77 and 80, respectively. The arc signal 77 is delayed for the interval T2 minus T1 (FIG. 7) to form a delayed signal 78. The contact signal 80 (i.e., the unblocked pulse 72) and a timed signal 79 formed by widening the delayed signal 78, are simultaneously applied to an "add" gate or coincidence detecting circuit 91 (FIG. 6) which produces an output or control signal 184 (FIG. 9). The output signal 184 operates the memory device 44 for indicating the quality of the percussion weld.

Attention is now directed to FIG. 6 wherein the apparatus 43 for practicing the method of monitoring the welding operation is shown to the right of a dashed line 84 and is connected by a main input lead 86 to the capacitor bank 41. The arc pulse 71 is conducted along the lead 86 and is applied to a blocking trigger, or detector circuit 87 that is rendered effective or triggered because the magnitude of the arc pulse voltage is equal to or more negative than the trigger voltage 73 (FIG. 7). When triggered, the detector circuit 87 generates the arc signal 77 (FIG. 8) which is applied to a first lead 88 of a pair of input circuit leads 89 of the coincidence circuit 91. The arc signal 77 is at the same time conducted to a delay circuit 92 which withholds application of the arc signal 77 to a second lead 93 of the pair of input leads 89. The delay circuit 92 withholds the arc signal 77 for the first interval T2 minus T1. The delay circuit 92 operates at the end of the first interval, T2 minus T1, to produce the delayed arc signal 78 (FIG. 8) that is applied to a signal timing or width circuit 94.

The width circuit 94 widens the delayed arc signal 78 to produce the timed signal 79 (FIG. 8) which is applied to the second lead 93 for the second interval, T4 minus T2. The second time interval is equal to the maximum permissible deviation of the time of completion of the welding arc 64 from the end of the first interval. Because the timed signal 79 is delayed, the timed signal 79 and the arc signal 77 are not applied to the input circuit leads 88 and 93 simultaneously. These signals are not, therefore, applied to a summing point 98 of the coincidence circuit 91 at the same time and thus the coincidence circuit 91 does not operate.

However, when an acceptable or satisfactory weld is produced, the capacitor bank generates the contact pulse 72, FIG. 7, (upon contact of the wire and the ferrule), simultaneously with the application of the timed arc signal 79 to the summing point 98. In response to the contact pulse 72, the trigger circuit 87 immediately generates the contact signal 80 (FIG. 8) which is applied directly to the first lead 88 of the input circuit leads 89. The timed arc signal 79 and the contact signal 80 thus reach the summing point 98 simultaneously and are effective to operate the coincidence circuit 91.

In operation, the coincidence circuit 91 generates the control signal 184 which renders effective a relay driver circuit 96 and a relay circuit 97 for actuating the memory device 44. The actuated condition of the memory device 44 is apparent upon inspection thereof for indicating the conformity of the weld to the manufacturing standards. Additionally, the memory device 44 renders the sorter mechanism 61 effective to permit the accepted assembly 22 to advance into the accepted assembly bin 56.

Referring now in detail to FIG. 9, where the weld monitoring circuit is illustrated, a first output lead 103 is connected from a first output terminal 104 of the capacitor bank 41 to the movable electrode 37 for supplying welding current to the lead wire 12 during the welding operation. The fixed electrode 42 of the welding apparatus 11 is connected to a frame 106 of the welding apparatus 11 by a lead 101. The frame 106 of the welding apparatus 11 is shown connected by a shunt resistor 107 to a second terminal 108 of the capacitor bank 41. The main input lead 86 of the weld monitoring circuit 43 is connected to the shunt resistor 107 at its connection with the capacitor bank 41. A second input lead 111 of the weld monitoring circuit 43 is connected to the frame 106 of the welding apparatus 11.

During the welding operation, there is a one to two volt potential across the shunt resistor 107. This potential varies proportionally with the welding electrode current and is sufficient to energize the weld monitoring circuit 43 upon striking and extinguishment of the arc 64 across the lead wire 12 and the ferrule 13 during the welding operation. For the purposes of description, the arc and contact pulses 71 and 72 generated by the capacitor bank 41 and the arc and contact pulses applied to the monitoring circuit 43 will be referred to interchangeably; it being understood that the latter pulses are proportional to the former pulses.

During the welding operation, the capacitor bank 41 applies the arc pulse 71 to the main input lead 86 of the weld monitoring circuit 43 for energizing the trigger circuit 87. The trigger circuit 87 may be of the Schmitt type and includes a first normally non-conductive transistor 120 having a base 121, a collector 122, and an emitter 123 that is connected to a common emitter resistor 124. The collector 122 is cross-coupled to a base 131 of a second normally conductive transistor 130 provided with a collector 132 and an emitter 133 connected to the common emitter resistor 124. During conduction of the transistor 130, the emitter current through the common emitter resistor 124 maintains the emitter 123 negative with respect to the base 121 for maintaining the transistor 120 in a cutoff condition. The resistance of the common emitter resistor 124 may be adjusted to select a desired trigger voltage 73 (FIG. 7) required to operate the transistor 120.

The arc pulse 71, which is acceptable because the amplitude thereof is equal to or more negative than the trigger voltage 73, is conducted through the main input circuit 86 to the base 121 for forward biasing the transistor 120. Upon conduction of the transistor 120, the potential of the collector 122 becomes less negative and thus a positive going pulse or arc signal 77 is couped through an R-C network 128 to the base 131 for rendering the transistor 130 non-conductive. The transistor 120 remains conductive and the transistor 130 remains non-conductive until the arc pulse 71 becomes less negative than the trigger voltage 73. The transistor 120 is maintained conductive by the arc pulse 71 as long as the arc pulse is sufficiently more negative than the trigger voltage 73. The trigger voltage 73 is substantially an unvarying D.C. voltage as it appears between the emitter 123 or the emitter 133 and a conductor 126. This unvarying quality is established by the filtering action of a capacitor 125 connected between the emitters 123 and 133 and the conductor 126.

The positive going pulse (arc signal) 77 from the collector 122 of the transistor 120 is impressed on an R-C network 146 and a flip-flip or monostable multivibrator 147 provided in the delay circuit 92. The arc signal 77 is impressed on a base 141 of a normally conductive transistor 140 provided in the multivibrator 147 for driving the transistor 140 into cutoff. A negative going pulse 148 from a collector 142 of the transistor is cross-coupled to a normally cutoff transistor 150. The negative going pulse 148 renders the transistor 150 conductive, whereupon a positive going pulse 154 from a collector 152 of the transistor 150 is impressed on a delay network 156. The delay network 156 may be adjusted to select a desired delay interval, such as the first interval T2 minus T1. The delay network 156 withholds application of the positive going pulse 154 to the base 141 for the first interval T2 minus T1 (FIG. 7). Then the delay network 156 discharges through resistors 157 and 158 rendering the base 141 less positive. When the base 141 becomes negative, the transistor 140 conducts, causing a positive going pulse or delayed arc signal 78 from the collector 142 to be impressed on a diode 164 provided in the width circuit 94.

A resistor 166 is provided in the width circuit 94 for back-biasing the diode 164 to prevent application of a negative going pulse 159 from the collector 142 of the transistor 140 to a multivibrator or flip-flop 167 provided in the width circuit 94. The diode 164 conducts the positive going delayed arc signal 78 to a base 161 of a normally conductive transistor 160 for driivng the transistor 160 into cutoff. A negative going pulse or timed arc signal 79 from a collector 162 of the transistor 160 is coupled by an R-C network 168 to a base of a second transistor 170 of the multivibrator 167. The negative going pulse 79 renders the transistor 170 conductive whereupon a positive going pulse 169 from a collector 172 of the transistor 170 is applied to a time delay network 175. The time delay network 175 discharges after the second time interval T4 minus T2 through resistors 166 and 176. Upon the discharge, the base 161 of the transistor 160 becomes negative and the transistor 160 is again rendered conductive.

During the second interval T4 minus T2, the transistor 160 is cut off. During cutoff, the negative going pulse or timed arc signal 79 from the collector 162 is impressed through the second input lead 93 of the "add" circuit 91 to the summing point 98. Thus, the timed arc signal 79 is impressed on the summing point 98 during the second interval T4 minus T2.

In the production of an acceptable weld, the capacitor bank 41 generates the contact pulse 72 during the interval T4 minus T2. The contact pulse voltage, being equal to or more negative than the trigger voltage 73, renders the transistor 120 conductive and drives the transistor 130 into cutoff. Upon cutoff, a negative going pulse or contact signal 80 from the collector 132 of the transistor 130 is applied directly to the first input lead 88 and impressed on the summing point 98. As shown in FIG. 8, the contact signal 80 and the timed signal 79 coincide in time and are thus applied to the summing point 98 simultaneously. The combined potentials of the timed signal 79 and the contact signal 80 are sufficient to render conductive a transistor 180 of the "add" circuit 91. Upon conduction of the transistor 180, the positive going pulse or control signal 184 is applied from a collector 182 of the transistor 180 to a base 191 of a transistor 190 provided in the relay driver circuit 96. The transistor 190 is normally conductive and is driven to cutoff by the positive going pulse 184. Upon cutoff, a negative going pulse 194 from a collector 192 of the transistor 190 is coupled to a base 201 of a normally non-conductive transistor 200 for rendering the transistor 200 conductive.

Upon conduction of the transistor 200, a positive going pulse 204 from a collector 202 of the transistor 200 is impressed on an electrode 211 of a four-layer control rectifier 210 of the relay circuit 97. The positive going pulse 204 triggers the control rectifier 210 for energizing a relay 220 through an anode circuit 350 that may be traced from a second electrode or anode 212 of the rectifier 210 through the relay 220, through a normally closed contact 231, through a resistor 223, and through a third electrode 213 of the relay 220. The relay 220 draws up a normally open contact 221 and a normally open contact 222 for completing a circuit that may be traced from the third electrode 213 through a resistor 224, through a parallel combination of a relay 230 and a delay capacitor 234, through a potentiometer 236, through the now closed contact 221, through a solenoid 237, and through the now closed contact 222 to ground. The capacitor 234 charges and delays the energization of the relay 230 for an interval whereafter the relay 230 draws up and opens the contact 231. Opening of the contact 231 opens the anode circuit 350 of the control rectifier 210 to restore the control rectifier to its original off condition. Opening of the anode circuit 350 deenergizes the relay 220 which releases the contacts 221 and 222 for restoring the relay 230 and the solenoid 237 from their energized conditions to their original conditions. In its energized condition, the solenoid 237 operates a pneumatic valve 238 for supplying pneumatic pressure from a pneumatic supply 239 to an air cylinder 241 (FIG. 3) provided in the memory device 44.

The memory device 44 is shown in FIGS. 3 and 4 including a series of memory units or flags 251 mounted on the carrier 29 at spaced intervals corresponding to the spacing of the ferrule holders 31 on the carrier 29. The flags 251 are mounted for rotation on stub shafts 252 extending horizontally from the carrier 29. As the carrier 29 indexes, the flags 251 are advanced into successive alignment first, with a flag actuator arm 253 that is operated by the air cylinder 241; secondly, with a discharge control microswitch 254 (see also FIG. 1); and third with the cam 62.

As each holder 31 advances past the feed station 32, the flag 251 adjacent the holder is rotated on its stub shaft 252 into a normal, generally horizontal position by the cam 62. A first retainer bar 256 mounted on each flag 251 is moved upon rotation of the flag into engagement with a resilient latch or spring 257 provided for each flag for releasably maintaining the flag 251 in the horizontal position. In the horizontal position, the flag 251 is in condition for actuation upon alignment with the actuator arm 253.

Assuming the weld monitoring circuit 43 has ascertained that an acceptable weld has been effected on an assembly 22 mounted on a holder 31 located at the welding station 34, the actuator arm 253 is advanced by the air cylinder 241 into an extended position (see dash lines in FIG. 4) and engages a depending section 258 of a flag that is adjacent to the holder 31. The actuator arm 253 overcomes the latching force of the spring 254 and rotates the flag 251 into an actuated position (shown in dash lines in FIG. 4). A second retainer bar 261 mounted on the flag 251 engages the spring 257 for releasably maintaining the flag in the actuated position. It may be appreciated that the fact that the weld conforms to the manufacturing standards is indicated by the flag 251 located in the actuated position.

The carrier 29 then indexes the acceptably welded assembly 22 from the welding station 34 to the discharge station 46 and indexes the actuated flag 251 into alignment with the microswitch 254. When the flag 251 is in the horizontal position and is aligned with the microswitch 254, a contact arm 262 of the microswitch 254 is actuated by the flag 251. Conversely, when the flag 251 is in the actuated position, the contact arm 262 is not engaged by the flag and does not operate the microswitch 254. The microswitch 254 therefore does not complete a reject or sorting signal generating circuit 263 (shown in FIG. 5) and accordingly the sorter mechanism 61 does not operate. The accepted assembly 22 is then advanced by the stripper mechanism 47 and the removing device 48 into the opening 52 of the hood 53 that surrounds the receiving bins 56 and 57. The welded assembly 22 advances into engagement with a slanted rear wall 271 of the hood, is deflected downwardly, and drops into the accept bin 56.

The stripper mechanism 47 is shown in FIG. 5 including an air cylinder assembly 281 for reciprocating a channel member 282. The walls 283 of the channel member 282 are disposed vertically for defining a guideway 284 into which a lower shoulder portion 286 of the holder 31 advances as the holder indexes to the discharge station 46. Lips 287 project horizontally from the walls 283 over the shoulder 286 for engaging the shoulder upon downward movement of the channel member 282. A switch 291 (FIG. 1) is actuated by a cam 292 secured to a shaft 293 of the Geneva drive mechanism 27 for energizing a solenoid valve (not shown) to cyclically operate the air cylinder assembly 281 each time a holder 31 is indexed to the discharge station 46. When the air cylinder assembly 281 is operated, the channel member 282 pulls the holder 31 downwardly relative to the carrier 29.

As shown in FIG. 5, a stripper arm 296 secured to a frame 297 extends over the carrier 29 into the path of an indexing holder 31. The holder 31 advances the post 33 to the end of a slot 298 formed in the stripper arm 296 and positions the ferrule 13 above the stripper arm 296. The flange 18 of the ferrule 13 is wider than the slot 298, so that upon downward movement of the holder 31, the flange 18 engages the upper surface 301 of the stripper arm 296. The stripper arm 296 prevents the ferrule 13 from moving with the post 33 so that the assembly 22 is stripped or removed from the post.

Attention is now directed to FIG. 1 where the removing device 48 is shown for propelling the stripped assembly 22 into the opening 52 of the hood 53. A clamp 302 is mounted to the stripper arm 296 for holding a resilient flipper or assembly propelling spring 303 in the path of the assembly 22. As the holder 31 advances the post 33 into the slot 298, the ferrule 13 of the assembly 22 engages and flexes the resilient flipper 303 to condition the flipper for operation. It may be appreciated that upon stripping of the assembly 22 from the post 33, the flipper 303 is effective to propel the assembly 22 along the discharge path 51 into the opening 52 of the hood 53. The discharge path 51 is defined by spaced guides 304 that straddle the stripper arm 296 for directing the propelled assembly 22 into the opening 52.

Assuming that the weld monitoring circuit 43 ascertains defective welds, and therefore that no control signal 184 is generated by the coincidence circuit 91 for operating the flag actuating arm 253, a flag 251 that has been indexed into alignment with the actuator arm 253 remains in the horizontal position. Upon indexing of the carrier 29, the defective assembly 22 is advanced to the discharge station 46 and the flag 251 is aligned with the microswitch 254. The depending section 258 of the aligned flag 251 engages the contact arm 262 and actuates the microswitch 254. The microswitch completes the sorting signal generating circuit 263 (FIG. 5) that may be traced from a power supply 311 through a pair of contacts closed by the contact arm 262, and through a solenoid valve 313 to ground. The solenoid valve 313 is effective to supply compressed air to a conduit 314 connected to an air cylinder assembly 316 of the sorter device 61.

A piston rod 317 of the air cylinder assembly 316 supports a movable wall 321 or partition for movement between an extended position (shown in dash lines in FIG. 5) and a retracted position. In the retracted position, a horizontal lip 322 secured to a canted section 323 of the wall 321 cover the defective assembly bin 57 and overlaps a portion of the stripper arm 296, for preventing the propelled assemblies 22 from entering the defective assembly bin 57. Thus, the acceptable assemblies 22 are propelled in the discharge path 51 and advance over the defective assembly bin 57 into the rear wall 271 of the hood 53, which deflects them into the accepted assembly bin 56.

In the extended position, the wall 321 projects across the full width of the hood 53 and intersects the discharge path 51 so that the lip 322 is in engagement with a roof 324 of the upper surface of the hood 53. In this position, the canted section 323 and the wall 321 are effective to deflect a propelled assembly 22 from the discharge path 51 and direct the assembly into the defective assembly pin 57.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a percussion welding device having facilities for moving a pair of elements into percussive engagement,
   energy storage means connected to said facilities for striking an arc and passing a current between said elements,
   means coupled to said energy storage means for generating a first pulse indicative of the current pulse through said elements during said striking of said arc and a second pulse indicative of the current pulse through said elements during said percussive engagement,
   means coupled to said generating means for delaying said first pulse a predetermined duration, and
   means responsive only to the coincidence of said second pulse and said delayed first pulse for producing a third pulse indicative of a characteristic of said weld.

2. In a percussion welding device having facilities for advancing a pair of elements into percussive contact,
   energy storage means connected to the facilities for striking an arc and passing a current between the elements,
   means for generating a first pulse indicative of the current pulse through said elements during said striking of said arc,
   means connected to the facilities for generating a second pulse indicative of the current pulse through said elements during said percussive contact, and
   means responsive to both said first and second pulses exceeding a predetermined magnitude for producing a signal indicative of a characteristic of a percussion weld.

3. In an apparatus for monitoring percussive welds formed between components,
   means for generating a succession of welding pulses,
   first means for blocking successive welding pulses below a predetermined energy level,
   means operated by the first means in response to the receipt of a first pulse exceeding said predetermined energy level for delaying said first unblocked pulse,
   means operated by the simultaneous receipt of an unblocked pulse next succeeding said first pulse and said delayed first pulse for generating a control pulse, and
   means actuated by said control pulse for indicating the acceptability of the weld.

4. In an apparatus for monitoring the magnitude of and the interval between an arc pulse generated upon striking of a welding arc across a pair of elements and a contact pulse generated upon percussive contact of the elements to analyze a percussion weld between the elements,
   a gate having a pair of input circuits,
   means responsive to said arc pulse having a predetermined magnitude for generating an arc signal and responsive to said contact pulse having a predetermined magnitude for generating a contact signal,
   means for applying the contact signal to one of said input circuits,
   means rendered effective by said arc signal for delaying the arc signal for a predetermined interval,
   means responsive to the delayed arc signal for applying a timed signal to the other of the pair of input circuits, and
   means actuated by the gate upon simultaneous application of said contact and timed signals to said input circuits for indicating the acceptability of the percussion weld.

5. A method of indicating the quality of a percussion welding operation which comprises
   generating a first pulse in response to the striking of a welding arc between a pair of elements, generating a second pulse in response to the percussive contact of the pair of elements, blocking first and second pulses less than a first predetermined magnitude, delaying said first pulse greater than said predetermined magnitude for a predetermined period of time indicative of a satisfactory welding operation, simultaneously applying said delayed pulse and said second pulse greater than said predetermined magnitude to a coincident circuit, producing an output pule from the coincident circuit upon simultaneous application of said first and second pulses, and then applying said output pulse to operate an indicating device.

6. A method of controlling a device for sorting welded components according to the quality of a percussion weld formed by striking a welding arc across said components and advancing a first of the components into percussive contact with a second of said components, which comprises the steps of generating an arc pulse upon striking of said welding arc, generating a contact pulse upon percussive contact of said components, detecting a minimum predetermined magnitude of said arc and contact pulses indicative of an acceptable condition of said welding arc, withholding application of an arc pulse having said predetermined magnitude to an adding gate for a first predetermined interval indicative of the minimum duration of said welding arc necessary for producing an acceptable weld, applying said withheld arc pulse to the adding gate for a second interval indicative of the maximum permissible deviation of the time of generation of the contact pulse from the completion of said first predetermined interval, impressing a contact pulse having at least said minimum magnitude on the adding gate during the application of said arc pulse to said gate, producing a control pulse from said adding gate upon simultaneous application of said arc and contact pulses, and applying the control pulse to the sorting device to separate the components according to the quality of the percussion weld.

7. In an apparatus for sorting a percussively welded assembly advanced on a carrier according to the conformity of the percussive weld to manufacturing standards wherein said standards prescribe minimum acceptable magnitudes of an arc pulse struck across a pair of components of the assembly and a contact pulse generated upon percussive contact of the components, and prescribed a predetermined acceptable interval of time between the striking of the arc pulse and the generation of the contact pulse, removing means for advancing the welded assembly from the carrier, means rendered successively conductive by intermittent receipt of said arc pulse and said contact pulse having acceptable magnitudes for generating successive signals, an "and" circuit having a summing point, means for conducting a first of said successive signals to the summing point, means for withholding application of said first signal to the conducting means to impart to said first signal a delay equal to said acceptable interval, means for applying a second of said successive signals to the summing point, means for rejecting a defectively welded assembly advanced by the removing means from the carrier, and means rendered operative upon simultaneous receipt of the delayed signal and the second signal at said summing point for maintaining the rejecting means ineffective to reject an acceptable welded assembly.

8. In an apparatus for analyzing a percussion weld joining an assembly of components advanced by an indexing carrier from a welding station to a discharge station, means at said welding station for percussively welding the components to form said assembly, said welding means including first means for advancing a first of said components into percussive engagement with a second of said components, and second means for striking a welding arc across said first and second components to generate an arc pulse upon striking of said arc and to generate a contact pulse upon percussive engagement of said components;

means for blocking said arc and contact pulses having less than a predetermined magnitude;

means connected to the blocking means for delaying an unblocked arc pulse for a preselected interval;

means rendered effective by the simultaneous receipt of the delayed arc pulse and an unblocked contact pulse for generating a signal indicative of an acceptable weld;

a hood provided with a first compartment for receiving an assembly having an acceptable weld and a second compartment for receiving an assembly having a defective weld, said hood having an opening facing said carrier;

means at said discharge station for propelling an assembly from the carrier into said opening;

flag means normally located in a second position and actuated in response to said signal for movement into a first position to indicate the acceptability of the weld; and partition means actuated by the flag means in said second position for movement into the hood to deflect a propelled assembly into the second compartment.

9. In an apparatus for monitoring percussion welds formed between components advanced by a carrier, means for generating a succession of welding pulses, first means for blocking successive welding pulses below a predetermined energy level, means operated by the first means for delaying a first unblocked pulse of said succession of welding pulses, means operated by the simultaneous receipt of an unblocked pulse next succeeding said first pulse and said delayed first pulse for generating a control pulse, a plurality of bins for receiving welded components, means for discharging welded components from the carrier into said bins, and means operated by the control pulse for selectively directing the welded components into the bins according to the quality of the weld.

10. An apparatus for monitoring a percussion welding operation to determine the quality of a percussion weld joining a pair of components, means for successively generating first and second welding pulses in response to the successive commencement and extinguishment of a percussion welding arc, a trigger circuit for blocking said successive welding pulses less than a predetermined level indicative of a satisfactory condition of said welding operation, a pair of series connected multivibrators for imparting a delay to a first of the successive welding pulses exceeding said predetermined level and for generating at the conclusion of said delay a coincident signal for a preselected period, said coincident signal representing a permissible deviation in time between said successive welding pulses for the production of a satisfactory weld, a coincidence circuit rendered effective upon simultaneous receipt of said coincident signal and a second of the successive pulses having a magnitude exceeding said predetermined magnitude for producing a control pulse, a flag movable into selected positions for indicating the quality of the percussion weld, and means actuated by the control signal for selectively positioning the flag.

11. An apparatus for monitoring a percussion welding operation to determine the quality of percussion welds joining pairs of components mounted on anvils and indexed by a carrier from a welding station to a discharge station, capacitor means for successively generating first and second welding pulses in response to the successive commencement and extinguishment of a percussion welding arc, a detector circuit for blocking successive welding pulses less than a predetermined level indicative of a satisfactory condition of said welding operation, a pair of series connected multivibrators for withholding a first of the successive welding pulses exceeding said predetermined level to delay the pulse and for generating at the conclusion of said delay a coincident signal for a preselected period, said coincident signal representing a permissible deviation in time between said successive welding pulses for the production of a satisfactory weld, an adding gate rendered effective upon simultaneous receipt of said coincident signal and a second of the successive pulses having a magnitude exceeding said predetermined magnitude for producing a control pulse, a flag movable on said carrier into first and second selected positions for indicating the quality of a weld joining an assembly of components mounted on a first anvil located at the welding station, a plunger at said welding station for moving the flag into a first of said positions, means actuated by the control signal for operating the plunger, a resilient latch mounted on the carrier for releasably maintaining the flag in said first position, a flipper rendered effective upon indexing of said first anvil to said discharge station for removing the assembly of components from the carrier, a device actuated by the flag upon indexing of said flag to the discharge station in said second selected position for sorting defectively welded assemblies from acceptably welded assemblies removed from the carrier by the flipper, and cam means interposed along the path of said flag from the discharge station to the welding station for overcoming said latch and moving the flag into the second selected position.

12. In an apparatus for monitoring a percussion weld formed between a pair of components of an assembly indexed by a carrier from a welding station to a component discharge station spaced from the welding station;

a charged capacitor bank connected across said elements for providing an electrical welding potential across said components;

a summing circuit having a pair of input leads;

a trigger circuit connected to the capacitor bank for generating an arc signal in response to an arc pulse having a predetermined magnitude and formed upon striking a welding arc across said components, said trigger circuit responsive to a contact pulse having a predetermined magnitude and formed upon percussive contact of said components for generating and applying a first coincident signal to a first of said input leads;

a first monostable multivibrator circuit having a first predetermined period of operation and rendered effective by said arc signal for generating a delayed signal upon completion of said first period of operation;

a second monostable multivibrator circuit having a second predetermined period of operation and responsive to the delayed signal for applying a second coincident signal to a second of the input leads during said second period of operation, a rectifier circuit for producing a control signal indicative of an acceptable weld;

an "and" gate responsive to concurrent application of the first and second coincident signals to said input leads for rendering said rectifier circuit effective;

a flag movably mounted on the carrier;

means responsive to the control signal for selectively moving the flag into a first of a plurality of positions;

means for receiving defective components having unacceptable welds;

means actuated by the flag positioned in a second of said positions upon index of said components to said discharge station for directing a defective component into said receiving means, and means interposed between the discharge station and the welding station for moving the flag from the first position into the second position to condition the flag for said selective movement.

References Cited by the Examiner

UNITED STATES PATENTS

| | | | |
|---|---|---|---|
| 1,979,786 | 11/1934 | Andrus | 219—109 |
| 2,264,047 | 11/1941 | McDowell | 219—109 |
| 2,322,052 | 6/1943 | Ogden et al. | 219—109 |
| 2,836,703 | 5/1958 | Boyle et al. | 219—95 |
| 2,855,496 | 10/1958 | Lawless et al. | 219—79 |
| 3,011,634 | 12/1961 | Hutter et al. | 209—74 |
| 3,016,142 | 1/1962 | Brown | 209—74 |
| 3,127,595 | 3/1964 | Coyne | 219—109 X |

RICHARD M. WOOD, *Primary Examiner.*